United States Patent
Matoba (10) Patent No.: US 9,350,789 B2
(45) Date of Patent: May 24, 2016

(54) INFORMATION PROCESSING APPARATUS USING TRANSMISSION HISTORY, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Tatsuo Matoba, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 14/018,664

(22) Filed: Sep. 5, 2013

(65) Prior Publication Data

US 2014/0082137 A1  Mar. 20, 2014

(30) Foreign Application Priority Data

Sep. 14, 2012 (JP) .................................. 2012-202770

(51) Int. Cl.
  *H04L 29/08*  (2006.01)
  *G06F 3/12*  (2006.01)
  *H04L 12/58*  (2006.01)

(52) U.S. Cl.
  CPC  *H04L 67/02* (2013.01); *G06F 3/12* (2013.01); *H04L 51/28* (2013.01); *H04L 67/06* (2013.01)

(58) Field of Classification Search
  CPC .......... H04L 51/28; H04L 67/02; H04L 67/06; G06F 3/12
  See application file for complete search history.

(56) References Cited

U.S. PATENT DOCUMENTS

| 2007/0288581 | A1* | 12/2007 | Yoshii ........................... 709/206 |
| 2011/0261397 | A1* | 10/2011 | Marunouchi ................. 358/1.15 |
| 2012/0147436 | A1* | 6/2012 | Nishiyama .................... 358/406 |

FOREIGN PATENT DOCUMENTS

JP  2010-081056 A  4/2010

* cited by examiner

*Primary Examiner* — Brian J Gillis
*Assistant Examiner* — Gil H. Lee
(74) *Attorney, Agent, or Firm* — Rossi, Kimms & McDowell LLP (57) ABSTRACT

An information processing apparatus that enables a user to transmit data to a desired destination even when the address was updated. A transmission unit transmits image data inputted into an address set. A history storage unit stores a transmission history of the image data transmitted. The transmission history includes an address and an address identifier for identifying the address stored in the address storage unit. A determination unit determines whether the address identified by the address identifier was updated after the transmission date recorded, when a user directs the transmission of image data using the transmission history. A control unit enables the selection of an address to which the image data is transmitted from among the addresses recorded in the transmission history and an updated address identified by the address identifier, when the address identified by the address identifier was updated after the transmission date recorded.

9 Claims, 7 Drawing Sheets

| 401 | 402 | 403 | 404 | 405 | 406 | 407 | 408 |
|---|---|---|---|---|---|---|---|
| DESTINATION ID | DESTINATION NAME | TRANSMISSION TYPE | TRANSMITTING DESTINATION ADDRESS | DESTINATION DETAILED INFORMATION | AUTOMATIC UPDATING DESTINATION FLAG | REGISTRATION DATE AND TIME | UPDATE DATE AND TIME |

| 501 | 502 | 503 | 504 | 505 | 506 | 507 | 508 |
|---|---|---|---|---|---|---|---|
| JOB ID | JOB EXECUTION DATE AND TIME | USER INFORMATION | IMAGE INFORMATION | EXECUTION RESULT | JOB NAME | JOB TYPE | JOB DETAILED INFORMATION |

500

| 5081 | 5082 | 5083 | 5084 | 5085 | 5086 | 5087 |
|---|---|---|---|---|---|---|
| TRANSMITTER INFORMATION | TRANSMISSION TYPE | TRANSMITTING DESTINATION NAME | TRANSMITTING DESTINATION ADDRESS | ADDRESS BOOK ID | TRANSMISSION PERIOD | TRANSMISSION IMAGE DATA INFORMATION |

INFORMATION PROCESSING APPARATUS USING TRANSMISSION HISTORY, CONTROL METHOD THEREFOR, AND STORAGE MEDIUM STORING CONTROL PROGRAM THEREFOR

BACKGROUND OF THE INVENTION

1. Field of the Invention

The present invention relates to an information processing apparatus that can select a suitable destination address when retransmitting data using a transmission history, a control method therefor, and a storage medium storing a control program therefor.

2. Description of the Related Art

There are some conventional information processing apparatuses, such as digital multifunctional peripheral devices, that display a list of results of executed jobs (copying, printing, transmission, etc.) as job execution histories (referred to as "job histories", hereafter). Displayed list enables a user to check results and destination addresses of transmission jobs etc. that were executed in the past. Moreover, such an information processing apparatus is able to record a destination address that caused a transmission error as a job history based on a result of execution of a transmission job, for example.

On the other hand, there is a known information processing apparatus that urges a user to check a setting detail of a destination address when a user sets the destination that caused a transmission error in the past using an address book (see Japanese Laid-Open Patent Publication (Kokai) No. 2010-81056 (JP 2010-81056A), for example).

However, the technique described in the above-mentioned publication cannot solve the following problem.

An address book that is managed by an information processing apparatus shall include a destination address of which the name is "monthly report submission folder", for example. Then, the path of the "monthly report submission folder" is updated every month. For example, the path in August, 2011 is "\\server102\201108", but the path in September, 2011 is "\\server102\201109". When such an operation form is adopted and a user submits a monthly report in September, 2011, it is necessary to transmit the report to "\\server102\201109" essentially. However, when the monthly report is transmitted using the job history executed in August, 2011, it will be transmitted to the destination "\\server102\201108" that is different from the essential destination "\\server102\201109". Thus, when a destination address in an address book used with a transmission job is updated after the execution result of the transmission job was recorded as a job history, a user cannot transmit data to a desired destination when the user executes a transmission job using the job history.

SUMMARY OF THE INVENTION

The present invention provides a technique that enables a user to transmit data to a desired destination even when the address of the desired destination recorded in a transmission history was updated.

Accordingly, a first aspect of the present invention provides an information processing apparatus comprising an address storage unit configured to store addresses, an input unit configured to input image data, a setting unit configured to allow a user to set one of the addresses stored in the address storage unit, a transmission unit configured to transmit the image data inputted by the input unit to the address set by the setting unit, a history storage unit configured to store a transmission history of the image data transmitted by the transmission unit, the transmission history including an address and an address identifier for identifying the address that is stored in the address storage unit, a determination unit configured to determine whether the address identified by the address identifier was updated after the transmission date recorded in the transmission history, when a user directs to transmit image data using the transmission history, and a control unit configured to enable to select an address to which the image data is transmitted from among the address recorded in the transmission history and an updated address that is identified by the address identifier, when the determination unit determines that the address identified by the address identifier was updated after the transmission date recorded in the transmission history.

Accordingly, a second aspect of the present invention provides a control method for an information processing apparatus having an address storage unit that stores addresses, a transmission unit that transmits image data inputted to one of the addresses set, and a history storage unit that stores a transmission history of the image data transmitted by the transmission unit, the transmission history including an address and an address identifier for identifying the address that is stored in the address storage unit, the control method comprising a determination step of determining whether the address identified by the address identifier was updated after the transmission date recorded in the transmission history, when a user directs to transmit image data using the transmission history; and a control step of enabling to select an address to which the image data is transmitted from among the address recorded in the transmission history and an updated address that is identified by the address identifier, when it is determined that the address identified by the address identifier was updated after the transmission date recorded in the transmission history in the determination step.

Accordingly, a third aspect of the present invention provides a non-transitory computer-readable storage medium storing a control program causing a computer to execute the control method of the second aspect.

According to the present invention, a user is able to transmit data to a desired destination even when the address of the desired destination recorded in a transmission history was updated.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
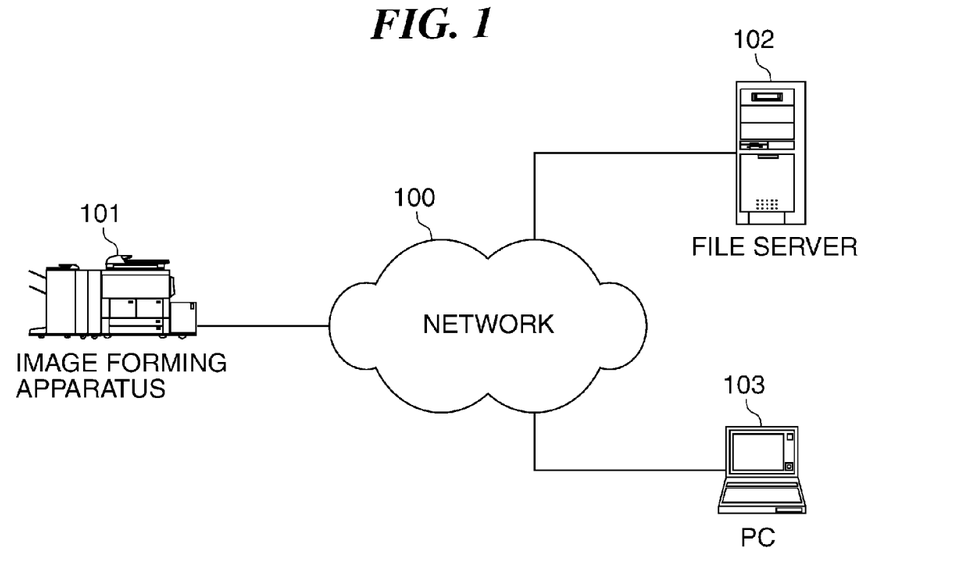
FIG. 1 is a general view of an image formation system containing an image forming apparatus as an information processing apparatus according to an embodiment of the present invention.

FIG. 1 is a general view of an image formation system containing an image forming apparatus as an information processing apparatus according to an embodiment of the present invention.

As shown in FIG. 1, the image forming apparatus 101 is an MFP (Multifunction Peripheral) that has various functions, such as scanning, printing, copying, transmission, and reception. This image forming apparatus 101 has a network interface that connects with the network 100 and exchanges various data, and can transmit an image file to a file server 102 and a PC 103 through the network 100.

The file server 102 is provided with a CPU, a ROM, a RAM, an HDD, a network interface, etc. For example, the image forming apparatus 101 is able to access a file and a folder that are stored in the HDD of the file server 102 through the network 100.

The PC 103 is a common personal computer having a CPU, a ROM, a RAM, an HDD, a network interface, etc. A viewer program for viewing file and folder on the file server 102 through the network 100, a mail application for sending and receiving an e-mail, and a Web browser application are installed in this PC 103.

Moreover, the PC 103 instructs the image forming apparatus 101 to print via the network 100, receives the transmission data from the image forming apparatus 101, and views a file on the file server 102 according to user's operations. For example, the user can connect with the image forming apparatus 101 through the network 100 using the Web browser application of the PC 103, and can instruct the image forming apparatus 101 to operate.

The network 100 is a network system, such as a LAN (Local Area Network) and the Internet. It should be noted that the numbers of the image forming apparatus 101, the file server 102, and the PC 103 are not limited to the illustrated example.

Figure 2:
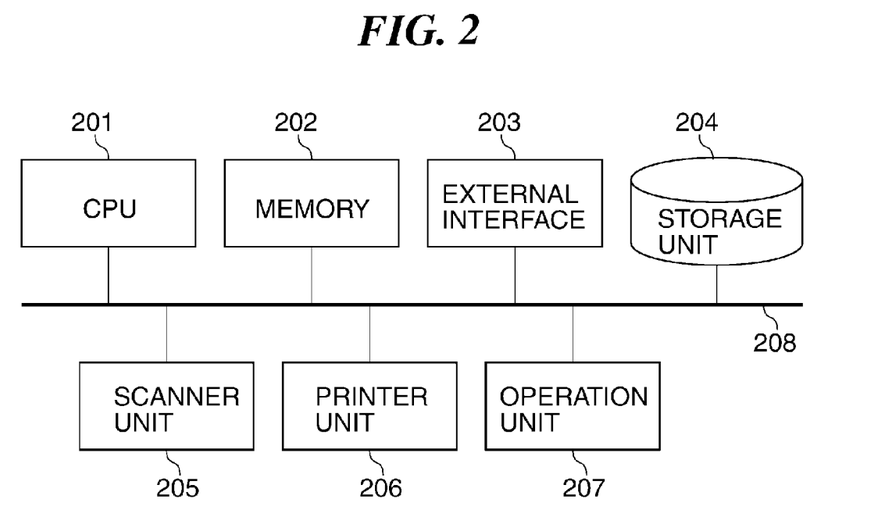
FIG. 2 is a block diagram schematically showing a hardware configuration of the image forming apparatus shown in FIG. 1.

FIG. 2 is a block diagram schematically showing a hardware configuration of the image forming apparatus 101 shown in FIG. 1. It should be noted that only main components are illustrated in FIG. 2.

The image forming apparatus 101 consists of a CPU 201, a memory 202, an external interface 203, a storage unit 204, a scanner unit 205, a printing unit 206, an operation unit 207, etc. These components are controlled by an MFP control unit 300 mentioned later.

The CPU 201 controls operations of the entire image forming apparatus 101, reads and runs the program stored in the memory 202 or the storage unit 204, and instructs the other components. Thereby, the image forming apparatus 101 executes operations of scanning, printing, transmission and reception, etc. The memory 202 has a ROM for storing various programs that are executed by the CPU 201, a RAM for storing data required for control temporarily, and the like. The CPU 201 implements processing modules, such as an operation control module 301 through a job reuse control module 306 that will be mentioned later, using the various programs and data that are stored in the memory 202.

The external interface 203 connects with the network 100 etc., and exchanges information with the file server 102, the PC 103, etc. The storage unit 204 consists of a nonvolatile memory, such as a hard disk, stores image data files that are generated by the various processes, and stores control information and setting information used in the various processes. The storage unit 204 is hardware that implements an address storage unit 307, a job history storage unit 308, a job reuse information storage unit 309, etc. that will be mentioned later. Data is read from and written to the storage unit 204 via the memory 202. It should be noted that the storage unit 204 may store the various programs instead of the ROM of the memory 202.

The scanner unit 205 illuminates an original put on a platen glass (not shown) and reads an original image optically, and converts the image into an electrical signal to generate image data. The printing unit 206 forms an image on a recording sheet according to the image data by cooperating with a laser exposure unit, an image forming section, a fixing unit, a feeding/conveyance unit, etc. that are not shown.

The operation unit 207 has a touch panel, various keys, a display unit, etc. that are used to receive user's operations and to display operating instructions etc. An internal bus 208 mutually connects the above mentioned components. Image data is transferred via the internal bus 208. Instructions and setting values for the components are transmitted and received via the internal bus 208.

Figure 3:
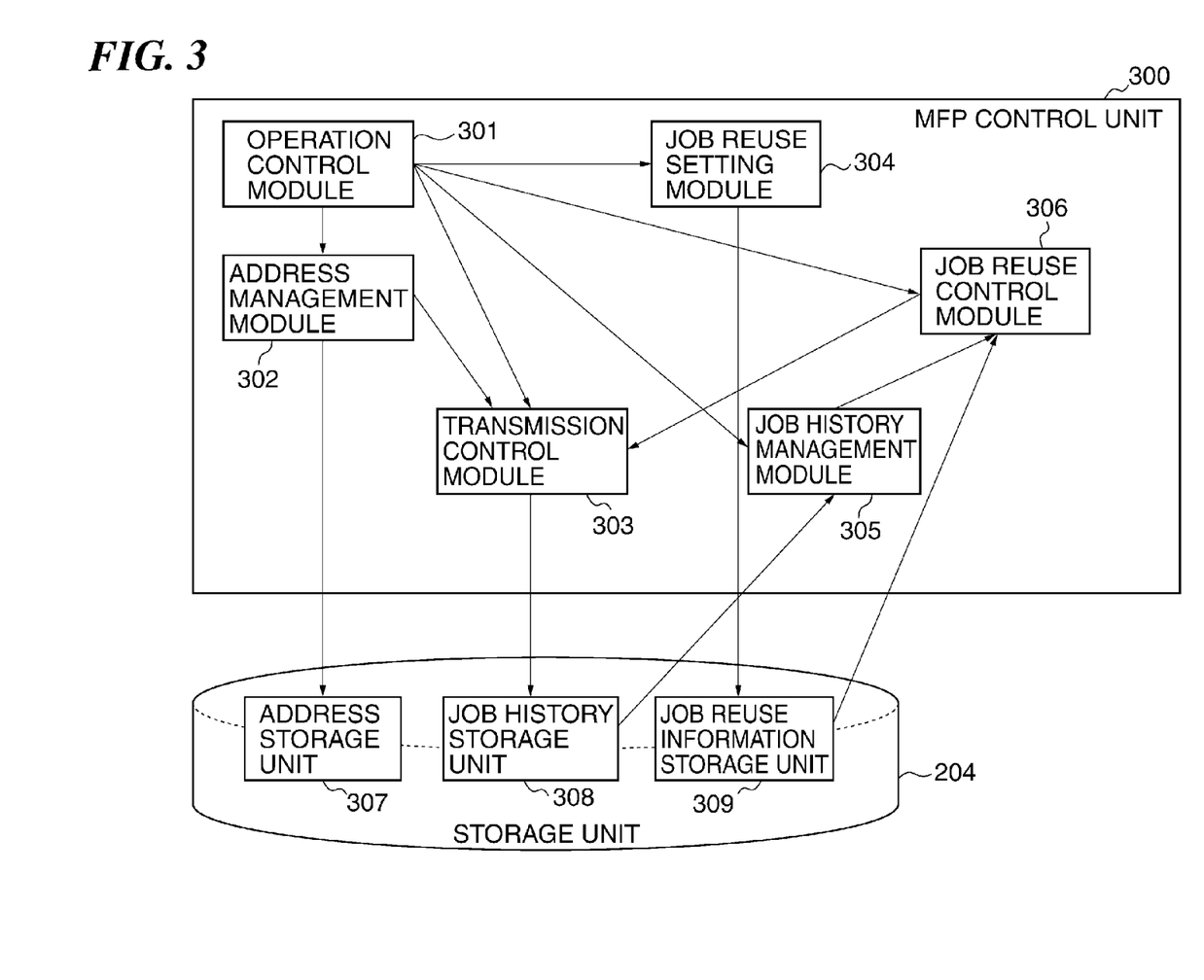
FIG. 3 is a view schematically showing a software configuration of the image forming apparatus shown in FIG. 1.

FIG. 3 is a view schematically showing a software configuration of the image forming apparatus 101. It should be noted that arrows in FIG. 3 show flows of data and processes.

As shown in FIG. 3, an MFP control module 300 of the image forming apparatus 101 consists of processing modules that include an operation control module 301, an address management module 302, a transmission control module 303, a job reuse setting module 304, a job history management module 305, and a job reuse control module 306. Each of the processing modules operates as an application program that is executed by the CPU 201 or as a part of the application program.

The storage unit 204 of the image forming apparatus 101 consists of information enclosures that include the address storage unit 307, the job history storage unit 308, and the job reuse information storage unit 309. Each of the information enclosures stores information into a hard disk, a nonvolatile memory, etc. using a file system or a database system. Moreover, a specific key or a condition allows a user to access specific information that is stored in the storage unit 204 and the address storage unit 307, the job history storage unit 308, and the job reuse information storage unit 309 that are sections of the storage unit 204.

The operation control module 301 controls the operation unit 207. Instruction information emitted when a user operates the operation unit 207 is given to the sections through the operation control module 301, which brings the image forming apparatus 101 into operation. On the other hand, instruction information received with the external interface 203 through the network 100 from the PC 103 or the like is given to the sections through the operation control module 301, which brings the image forming apparatus 101 into operation.

The address management module 302 manages transmitting destination information stored in the address storage unit

307. For example, the address management module 302 passes the transmitting destination information to the transmission control module 303. The transmission control module 303 is used when transmitting the transmitting destination information. The transmitting destination information includes a FAX number, a mail address, etc.

Although this embodiment describes the case where the address storage unit 307 is installed in the storage unit 204 in the image forming apparatus 101, the address storage unit 307 may be installed in the HDD in the file server 102, for example. In such a case, the address management module 302 of the image forming apparatus 101 manages the transmitting destination information stored in the address storage unit 307 in the file server 102 through the network 100. Moreover, the address storage unit 307 may be installed in a storage unit of another image forming apparatus on the network 100. Even in such a case, the address management module 302 manages the transmitting destination information stored in the address storage unit 307 in the other image forming apparatus through the network 100.

The transmission control module 303 controls a transmission job. When a user operates applications, such as a facsimile and an electronic mail, through the operation unit 207 etc., the scanner unit 205 scans an original and generates image data, and the image data is recorded into the memory 202 or the storage unit 204. Then, the transmission control module 303 converts the image data into predetermined data formats, such as PDF, JPEG, and TIFF, and transmits the converted image data to transmitting destinations, such as the file server 102 and the PC 103, through the network 100. At this time, the transmission control module 303 transmits data to an existing destination that is designated by a user through the operation unit 207 with reference to the transmitting destination information passed from the address management module 302, or to a new destination that is designated by the user through the operation unit 207.

The result of the transmission job that is controlled and executed by the transmission control module 303 is recorded in the job history storage unit 308 in the storage unit 204 as job history information. When the transmission control module 303 records the result of the transmission job in the job history storage unit 308, the image data concerned is stored in the storage unit 204 in order to allow to reuse the image data in a retransmission process etc.

The job reuse setting module 304 manages settings about reuse of jobs, such as reprinting and retransmission. Specifically, the job reuse setting module 304 stores the setting about reuse of jobs inputted by an administrator via the screen displayed on the operation unit 207 into the job reuse information storage unit 309 in the storage unit 204, and, manages it. It should be noted that the administrator manages the entire system containing the image forming apparatus 101, and differs from the user who only uses the image forming apparatus 101.

The job history management module 305 manages the history of jobs, such as printing, copying, transmission, and reception executed by the image forming apparatus 101. Moreover, the job history management module 305 indicates the job history information by displaying a job history screen 600 shown in FIG. 5 on the operation unit 207. In the case of a transmission job history, the job history management module 305 extracts the transmission job histories that the user who is operating the operation unit 207 can view from the job history storage unit 308, and displays a list of the extracted transmission job histories on the job history screen 600.

Figure 5:
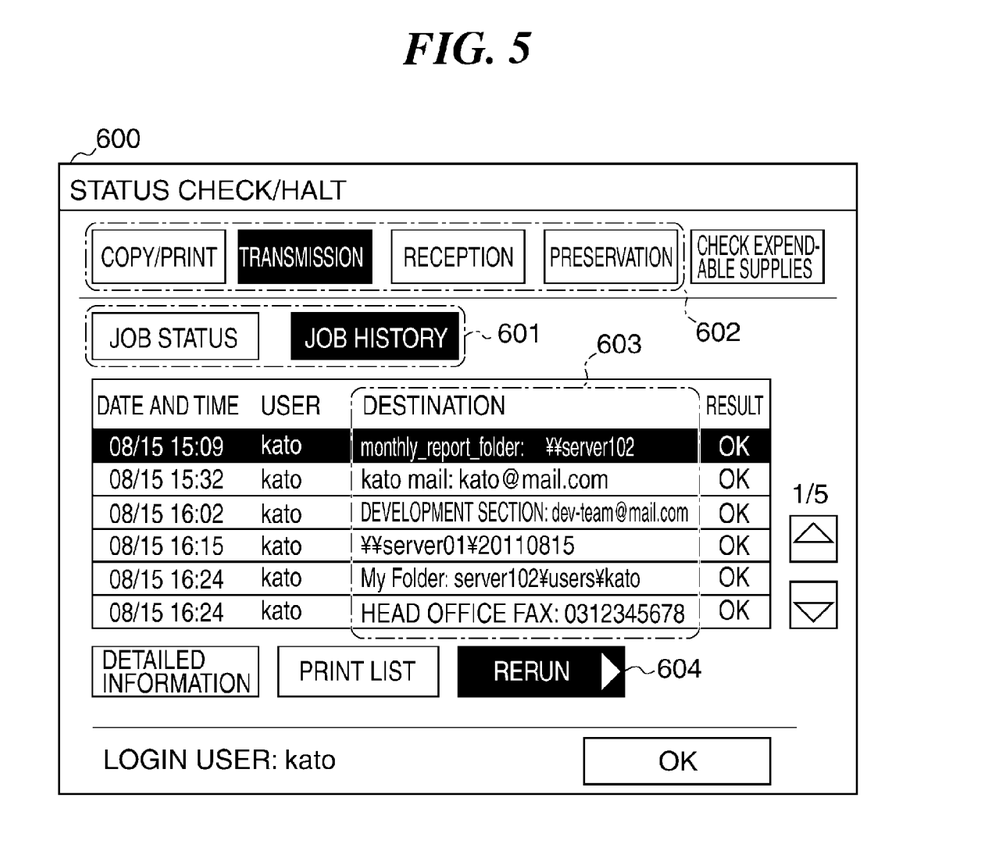
FIG. 5 is a view showing an example of a job history screen displayed on an operation unit shown in FIG. 2.

The job reuse control module 306 controls the reuse of the job history selected by the user on the job history screen 600 displayed on the operation unit 207. Specifically, the job reuse control module 306 obtains the type (printing, transmission, etc.) of a job that is permitted to rerun and information about a user who gives permission to rerun a job from the job reuse information storage unit 309. Then, the user determines whether the reuse of the job history is allowed or not based on the information.

First, the job reuse control module 306 obtains the information (job history information) about the job history from the job history storage unit 308 through the job history management module 305. Specifically, the job reuse control module 306 obtains the settings about reuse of the job from the job reuse information storage unit 309, when transmission is chosen as an operation to the job selected by the user on the job history screen 600. Then, the job reuse control module 306 directs to retransmit the data to the transmission control module 303 according to the settings about the reuse of a job established by the administrator. The settings about the reuse of a job history are established by the administrator through the retransmission setting screen 800 shown in FIG. 7. For example, the settings include information about whether use of the destination information of the job history information that is stored in the job history storage unit 308 at the time of retransmission is permitted.

Figure 4A:
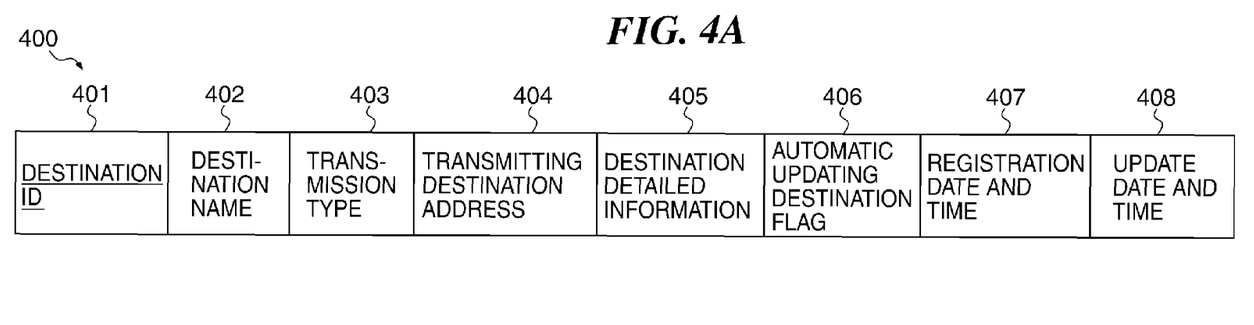
FIG. 4A is a view showing a configuration example of transmitting destination information stored in an address storage unit shown in FIG. 3.

FIG. 4A is a view showing a configuration of the transmitting destination information stored in the address storage unit 307.

The following information is included in a destination information table 400 as an address book.

A destination ID 401 is used to identify a destination information record that constitutes the destination information table 400. A destination name 402 is arbitrarily set up to a transmitting destination, and is displayed on the job history screen 600 displayed on the operation unit 207.

A transmission type 403 defines the type of transmission method, such as e-mail transmission, SMB transmission, FTP transmission, WebDAV transmission, facsimile transmission, and I-FAX transmission.

A transmitting destination address 404 shows a concrete transmitting destination according to the transmission type 403. For example, when the transmission type 403 is the e-mail transmission, the transmitting destination address 404 shows an e-mail address. When the transmission type 403 is the SMB transmission, the FTP transmission, or the WebDAV transmission, the transmitting destination address 404 shows a folder path of the file server 102 that is a transmitting destination.

Destination detailed information 405 is needed when data is transmitted to the transmitting destination contained in the transmitted destination address 404. For example, when the transmitting destination address 404 is an e-mail address, the destination detailed information defines whether transmitting data should be divided. Moreover, when the transmission type 403 is the SMB transmission, the FTP transmission, or the WebDAV transmission, the destination detailed information is authentication information required for connection with the transmitting destination.

An automatic updating destination flag 406 shows whether an address of a transmitting destination stored in the transmitting destination address 404 is updated automatically. When the automatic updating destination flag 406 is "YES", it is a destination where a character string stored in the transmitting destination address 404 is updated automatically. When the automatic updating destination flag 406 is "NO", it is a destination where a character string stored in the transmitting destination address 404 is not updated automatically.

An example of the address updated automatically will be described. The character string "\\server102\[yyyyMM]" that represents the folder on the file server 102 shall be stored in the transmitting destination address 404. When the transmitting destination address is used in August, 2011, the time entry is applied to the transmitting destination address 404 so as to be updated automatically to "\\server102\201108". Then, when the transmitting destination address is used in September, 2011, the time entry is applied to the transmitting destination address 404 so as to be updated automatically to "\\server102\201109". It should be noted that an address can be updated manually.

Registration date and time 407 is information about registration date and time of the destination information record that is uniquely determined by the destination ID 401. Update date and time 408 is information about update date and time of the destination information record that is uniquely determined by the destination ID 401.

Figure 4B:
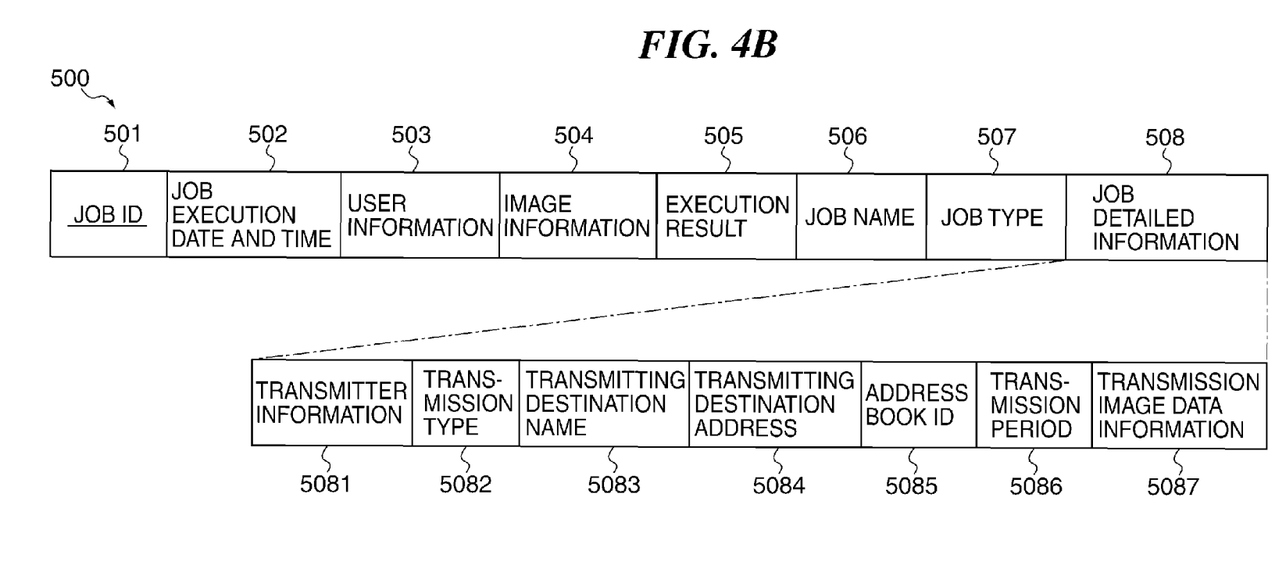
FIG. 4B is a view showing a configuration example of job history information stored in a job history storage unit shown in FIG. 3.

FIG. 4B is a view showing a configuration example of the job history information stored in the job history storage unit 308.

The following information is registered in a job history information table 500 as a job history information.

A job ID 501 is used to identify a destination information record that constitutes the job history information table 500. Job execution date and time 502 shows the date and time in which the job was executed. User Information 503 includes a user ID that specifies the user who executed the job.

Image information 504 is information about the image used at the time of execution of the job. When the transmission job is executed under the control of the transmission control module 303, the image data generated by reading an original with the scanner unit 205 and the information about the image data are stored in the storage unit 204. Then, when the transmission control module 303 adds the result of the transmission job for transmitting the image data to a predetermined destination to the job history information table 500, the information about the image data is stored in the image information 504.

The identification information that shows whether the execution result of the job was a success, an error, or a cancel, and a terminal code showing its reason are stored into an execution result 505. A job name 506 shows a name used for the job. For example, a file name of a printing object in the case of a print job, a name of a transmitting file in the case of a transmission job, etc. are included in the job name.

A job type 507 is a type of the executed job. Specifically, the types of job are copying, printing, transmission, preservation, etc. Job detailed information 508 is detailed information of a job that is different depending on the job type. This embodiment describes the job detailed information about a transmission job.

Transmitter information 5081 shows a name of a user who instructed to execute a transmission job, a source address, etc. A transmission type 5082 shows the type of a transmission job. The transmission type is information that shows transmission methods, such as e-mail transmission, SMB transmission, FTP transmission, WebDAV transmission, facsimile transmission, and IFAX transmission, for example. A transmitting destination name 5083 shows a name of a transmitting destination of a transmission job.

A transmitting destination address 5084 includes a destination address used as a transmitting destination of a transmission job and information accompanying the destination address. The transmitting destination addresses is a mail address of a destination in the case of the e-mail transmission, is a transmitting destination folder path in the case of the SMB transmission, and is a telephone number in the case of the facsimile transmission, for example. The information accompanying the destination address is authentication information that is needed when connecting with the transmitting destination.

An address book ID 5085 is information about the destination ID 401 showing the destination, for example, when the transmitting destination of the transmission job is stored in the address storage unit 307. A transmission period 5086 shows start time and completion time of a transmission job. Transmission-image-data information 5087 represents a color classification, such as color and monochrome, an image format, such as Jpeg, Tiff, PDF, and data size, etc. about the transmission image data that is generated by converting image data shown by the image information 504 at the time of the transmission to the transmitting destination address 5084.

The job reuse information storage unit 309 shown in FIG. 3 stores setting information about reuse of the executed print job and transmission job that were recorded as the job history. The setting items managed by the job reuse information storage unit 309 are established by the job reuse setting module 304 based on information inputted by the administrator through the retransmission setting screen 800 displayed on the operation unit 207 as shown in the FIG. 7. The administrator defines the setting items beforehand when reusing a job.

The job history management module 305 obtains job history information from the job history storage unit 308, and displays a job history list on the job history screen 600 on the operation unit 207. Then, the job reuse control module 306 obtains job reuse license information concerning permission and refusal of reuse of a job from the information stored in the job reuse information storage unit 309. Next, the job reuse control module 306 and the job history management module 305 determine whether the job history selected by a user from the job history information list is reusable using the job reuse license information.

The job reuse information storage unit 309 stores the information about whether use of the destination information stored in the transmitting destination address 5084 is permitted at the time of the retransmission using the job history information of the job history information table 500, for example.

Moreover, the job reuse information storage unit 309 stores the existing destination setting information used when the transmitting destination address of the destination information table 400 used by the transmission job concerned is updated at the time of retransmission using the history information of the transmission job. The existing destination setting information includes one of three choices about the existing destination at the time of retransmission. The first choice is to use the transmitting destination address 404 of the updated destination information table 400. The second choice is to use the transmitting destination address 5084 of the job history information table 500. The third choice is to make a user check the transmitting destination. The detail of the setting method for the existing destination setting information will be mentioned later.

The job history screen 600 shown in FIG. 5 is a screen for a user to check the history information of the various jobs executed by the image forming apparatus 101. This job history screen 600 is displayed on the operation unit 207, when the job history management module 305 controls and the operation control module 301 intercedes. It should be noted that the job history screen 600 may be displayed on a Web browser screen of the PC 103 connected via the network 100, when the job history management module 305 controls and the operation control module 301 intercedes.

Job situation/history indication change buttons 601 are used to select the display on the job history screen from among a list of job statuses during execution and a list of job histories that have been executed. This embodiment will be described on the precondition that it is set to display a list of job histories.

Job type selection buttons 602 are used to select the type of a job displayed in the list section on the job history screen 600. A user selects the job type displayed on the list from the job types, such as copying, printing, transmission, reception, and preservation. This embodiment shall select transmission as the job type.

The destination information designated as the transmitting destinations of the transmission jobs are displayed on an address display column 603. The job history management module 305 obtained the destination information displayed on this address display column 603 from the transmitting destination name 5083 and the transmitting destination address 5084 of the job history information table 500 stored in the job history storage unit 308. When the information obtained from the transmitting destination name 5083 is "monthly_report_folder" and the information obtained from the transmitting destination address 5084 is "\\server102\201108", the information of "monthly_report_folder: \\server102\201108" is displayed on the address display column 603.

A rerun button 604 is used to rerun the transmission job using the selected job history. This button is available only when one job history is selected from the job history list on the job history screen 600 and the user is able to rerun the transmission job using the job history. A press of the rerun button 604 will display a history job rerun screen (not shown). Then, according to the instruction from the user on the history job rerun screen, retransmission and printing, etc. that reuse the job history obtained from the job history storage unit 308 become executable.

Figure 6:
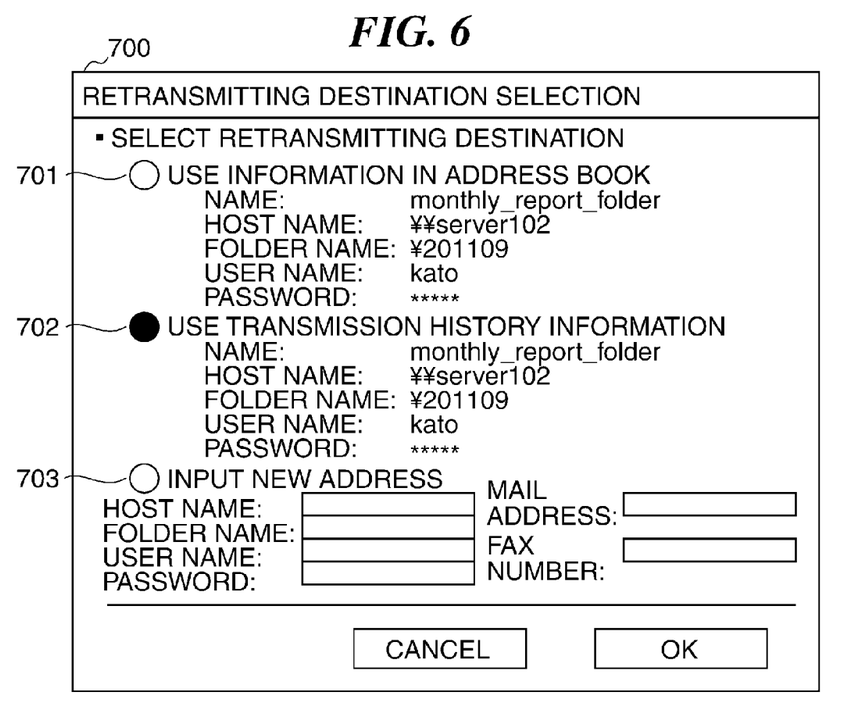
FIG. 6 is a view showing an example of a retransmitting destination selection screen displayed on the operation unit shown in FIG. 2.

A retransmitting destination selection screen 700 shown in FIG. 6 is displayed under a certain condition when a user selects one transmission job history from the job history list and presses the rerun button 604 on the job history screen 600, and when the user instructs retransmission on the history job rerun screen. The certain condition that allows displaying the retransmitting destination selection screen 700 will be mentioned later.

The retransmitting destination selection screen 700 is displayed on the operation unit 207, when the job reuse control module 306 controls and the operation control module 301 intercedes. It should be noted that the retransmitting destination selection screen 700 may be displayed on a Web browser screen of the PC 103 connected via the network 100, when the job reuse control module 306 controls and the operation control module 301 intercedes.

On the retransmitting destination selection screen 700, a user can select the transmitting destination that is designated at the time of retransmission. In the choice 701 to use information in an address book, the information about the transmitting destination stored in the destination information table 400 that is designated by the address book ID 5085 of the job history information table 500 about the job history concerned is displayed.

In the choice 702 to use transmission history information, the information about the transmitting destination name 5083 and the transmitting destination address 5084 that are stored in the job history information table 500 about the job history concerned is displayed. In the choice 703 to input a new address, input columns for a new transmitting destination are displayed.

When a user selects the choice 701 to use information in an address book, the information about the transmitting destination of the destination information table 400 that is designated by the address book ID 5085 of the job history information table 500 about the job history concerned is used as a destination of retransmission. That is, the transmitting destination address 404 registered into the destination information table 400 serves as the destination of retransmission. When a user selects the choice 702 to use transmission history information, the information about the transmitting destination name 5083 and the transmitting destination address 5084 of the destination information table 500 about the job history concerned is used as a destination of retransmission. That is, the transmitting destination used by the job history concerned is used as a destination of retransmission.

When a user selects the choice 703 to input a new address, the user is allowed to input a new destination at the choice 703 on the retransmitting destination selection screen 700, and the new destination inputted will be used as a destination of retransmission.

The destination information used for the retransmission that was set by the user on the retransmitting destination selection screen 700 becomes available when an OK button is pressed, and is used at the time of retransmission.

Figure 7:
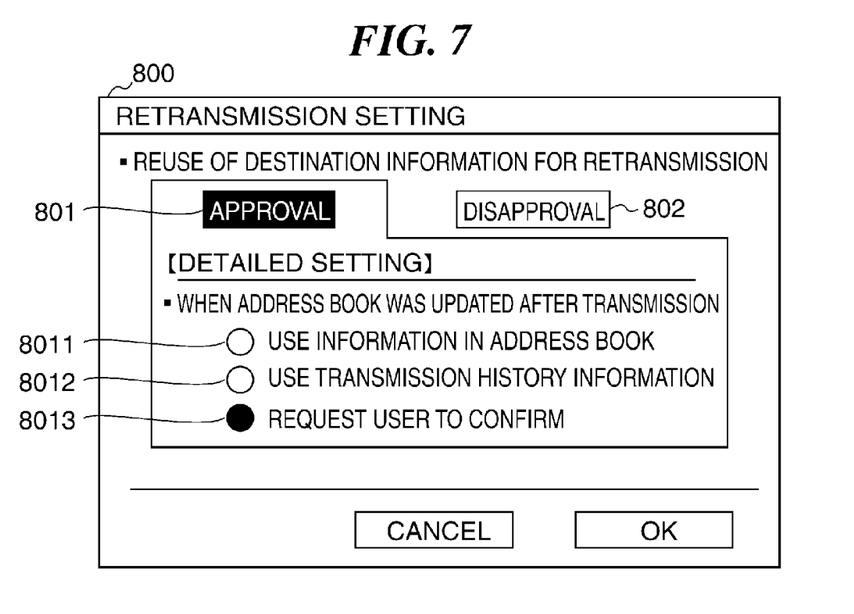
FIG. 7 is a view showing an example of a retransmission setting screen displayed on the operation unit shown in FIG. 2.

The administrator uses the retransmission setting screen 800 shown in FIG. 7 in order to establish permission or prohibition for a user to use the transmitting destination address registered in the job history information table 500 for retransmitting data using the job history.

The retransmission setting screen 800 is displayed on the operation unit 207, when the job reuse setting module 304 controls and the operation control module 301 intercedes. It should be noted that the job retransmission setting screen 800 may be displayed on a Web browser screen of the PC 103 connected via the network 100, when the job reuse setting module 304 controls and the operation control module 301 intercedes.

The administrator presses an address reuse approval button 801 when the administrator establishes that a user is allowed to use the information about the transmitting destination that is registered in the job history information table 500 about the job history concerned at the time of retransmission by reusing the job history.

The administrator presses an address reuse disapproval button 802 when the administrator establishes that a user is not allowed to use the information about the transmitting destination that is registered in the job history information table 500 about the job history concerned at the time of retransmission by reusing the job history. When the address reuse disapproval button 802 is selected, a user shall set a new transmitting destination at the time of retransmission by reusing the job history by the user.

When the administrator presses the address reuse approval button 801, one of check boxes 8011, 8012, and 8013 can be selected. Thereby, the transmitting destination can be set when the destination information table is updated. The administrator is able to select the existing transmitting destination address used for retransmission by checking one of the check boxes 8011, 8012, and 8013, even if the transmitting destination address 404 in the destination information table 400 has been updated.

When the user selects one transmission job history from the job history list displayed on the job history screen 600, presses the rerun button 604, and directs retransmission on the history job rerun screen (not shown), the update date and time 408 may be newer than the job execution date and time 502, because the transmitting destination address 404 of the destination information table 400 corresponding to the transmitting destination address 5084 may be updated based on the transmitting destination established by the administrator after the job execution date and time 502. At this time, the job reuse control module 306 determines that the destination information of the destination information table 400 was updated.

Moreover, the automatic updating destination flag 406 of the destination information table 400 corresponding to the transmitting destination address 5084 may be "YES", and the transmitting destination address 404 may be updated automatically. Also at this time, the job reuse control module 306 determines that the destination information of the destination information table 400 was updated.

When the administrator wants to regard the updated transmitting destination address 404 in the destination information table 400 as an existing destination, the check box 8011 is selected. On the other hand, when the administrator wants to regard the transmitting destination address 5084 of the job history information table 500 as an existing destination, the check box 8012 is selected. On the other hand, when the administrator wants to make a user designate the retransmitting destination, the check box 8013 is selected.

The information set by the administrator on the retransmission setting screen 800 becomes available by pressing the OK button, and is registered into the job reuse information storage unit 309 by the job reuse setting module 304.

When the check box 8013 is selected by the administrator, and when the destination information that is used by a user at the time of retransmission using the history job has been updated, the retransmitting destination selection screen 700 is displayed. The retransmission setting screen 800 enables the administrator to restrict reuse of a destination.

When the transmitting destination address 404 of the destination information table 400 has been updated after retransmitting data using the history information, a user can select one of the last transmitting destination and the newest destination, which is managed with the destination information table 400, as the destination to which the user wants to transmit data at the time of retransmission using the job history.

Moreover, environment where the image forming apparatus 101 is used may show a tendency to retransmit data to a former destination in most cases or to transmit data to the newest destination, which is managed with the destination information table 400, in most cases. In such a case, displaying a desirable destination as a default destination at the time of retransmission can save many users' troubles for resetting destinations.

Moreover, since priority is given to preventing erroneous retransmission, it becomes possible to make a user reset a destination explicitly at the time of retransmission.

Next, a retransmitting process in a transmission job execution process using job history information under the condition where the transmitting destination address 404 registered in the destination information table 400 has been updated before retransmitting data will be described.

Figure 8:
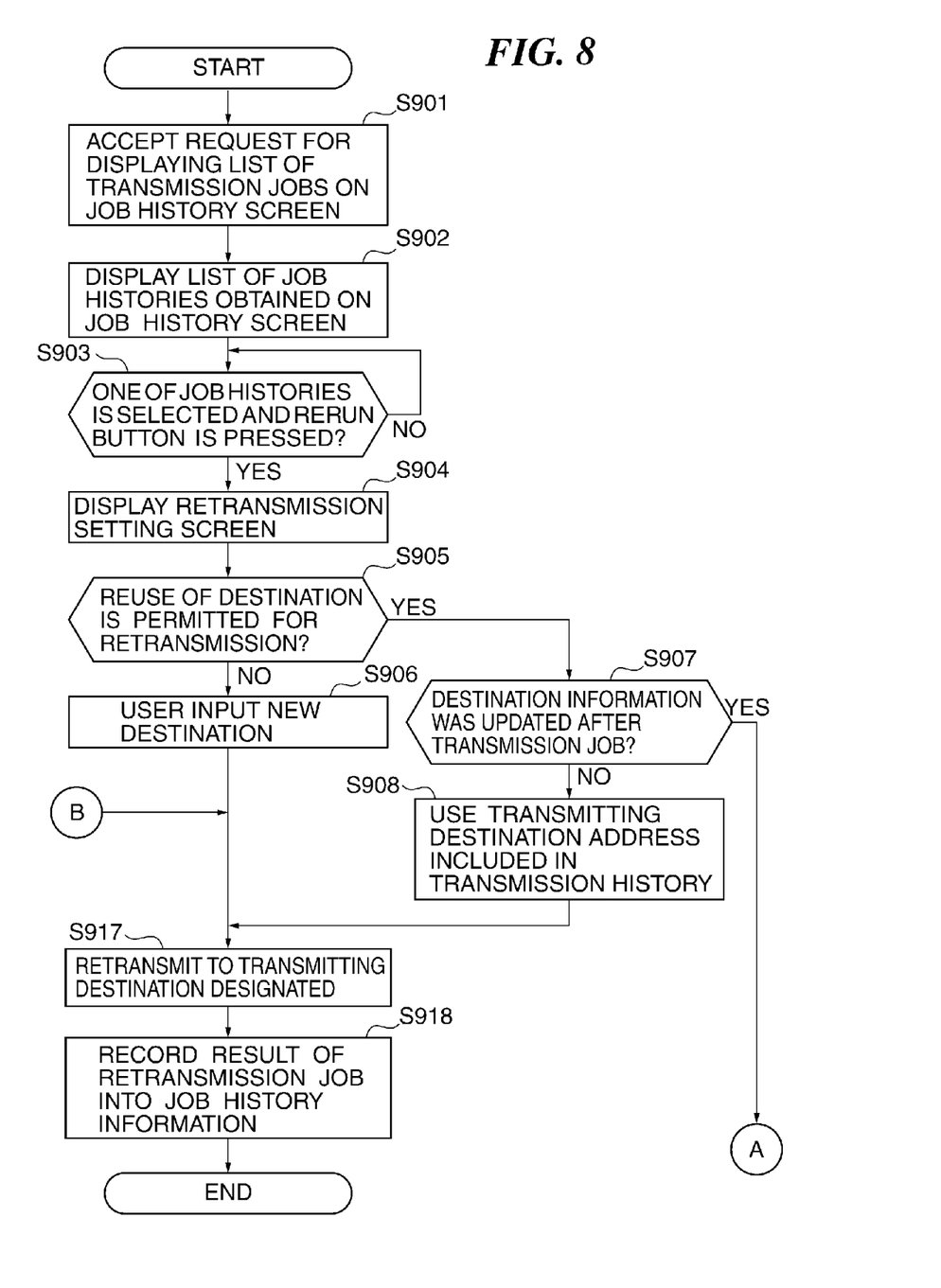
FIG. 8 is a flowchart showing a part of a transmission job execution process using the job history information in the image forming apparatus shown in FIG. 1.
Figure 9:
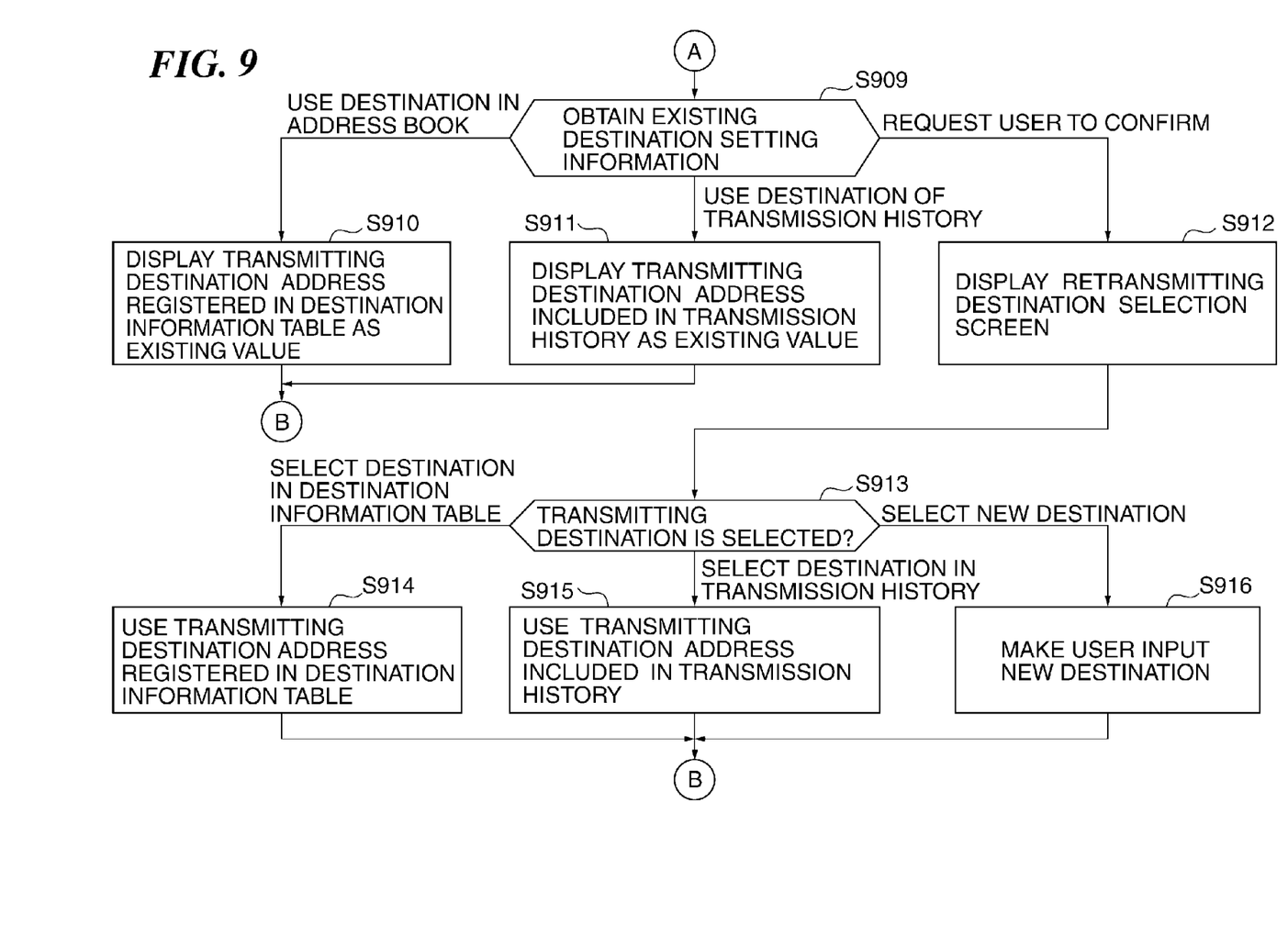
FIG. 9 is a flowchart showing the remainder of the transmission job execution process using the job history information in the image forming apparatus shown in FIG. 1.

FIG. 8 and FIG. 9 are flowcharts showing an example of the transmission job execution process using the job history information in the image forming apparatus 101.

In step S901 in FIG. 8, the operation control module 301 accepts a request for displaying a list of transmission jobs on the job history screen 600 shown in FIG. 5. Specifically, when the "transmission" is selected in the job type selection buttons 602 on the job history screen 600 and the "job history" is selected in the job situation/history indication change buttons 601, the operation control module 301 requests the job history management module 305 to display the list of transmission job histories.

When receiving the request from the operation control module 301, the job history management module 305 obtains the list of the transmission job histories that are viewable by the user from the job history storage unit 308 in the storage unit 204 in step S902. Then, the job history management module 305 displays the list of the transmission job histories on the job history screen 600 through the operation control module 301. When the job history management module 305 obtains the list of the transmission job histories that are viewable by the user, the module 305 determines whether reuse of the transmission job is permitted and determined whether the user information 503 of the job history information table 500 coincides with the user.

In step S903, the operation control module 301 determines whether the user selected one job history from the transmission job history list on the job history screen 600 and pressed the rerun button 604. When one job history is selected from the transmission job history list, the job reuse control module 306 receives instructions from the operation control module 301 and determines whether the rerun of the transmission job is permitted based on the information obtained from the job reuse information storage unit 309. Then, when the job reuse control module 306 determines that the rerun of the transmission job is permitted, the operation control module 301 enables the rerun button 604. When the rerun button 604 is pressed, the process proceeds to step S904.

In the step S904, the job reuse control module 306 displays the retransmission setting screen on the operation unit 207 through the operation control module 301 based on the information about the transmission job history obtained from the job history storage unit 308 through the job history management module 305. On the retransmission setting screen displayed on the operation unit 207, the information about the transmission job history is displayed, and the user can check whether the job is a correct target for the retransmission. The operation control module 301 that received the user's input on the retransmission setting screen can also select new image data to be retransmitted by directing to the job reuse control module 306.

In step S905, the job reuse control module 306 obtains the setting information of whether the transmitting destination information managed by the job history information table 500 about the job history will be used at the time of retransmission from the job reuse information storage unit 309. The setting information is set in the job reuse information storage unit 309 by the job reuse setting module 304 in response to an administrator's input through the retransmission setting screen 800 shown in FIG. 7. When use of the transmitting destination information managed by the job history information table 500 about the job history concerned is permitted at the time of retransmission, the process proceeds to step S907. On the other hand, when the use of the transmitting destination information is not permitted, the process proceeds to step S906.

In the step S906, the operation control module 301 detects that the user inputs new transmitting destination information through the retransmission setting screen, and notifies the job reuse control module 306 of the detection. The job reuse control module 306 regards the new transmitting destination information as the destination for retransmission.

In the step S907, the job reuse control module 306 determines whether the transmitting destination address 404 of the destination information table 400 has been updated after transmitting the transmission job. The job reuse control module 306 checks whether the applicable record in the destination information table 400 of the address storage unit 307 designated by the transmitting destination address 5084 concerned has been updated after the job execution date and time 502. Then, the job reuse control module 306 determines that the transmitting destination address 404 of the destination information table 400 has been updated, when the date and time stored in the update date and time 408 has been newer than the date and time stored in the job execution date and time 502. For example, the transmitting destination address 5084 of the job history information table 500 shall be "\\server102\201108" and the job execution date and time 502 shall be "15:50 on Aug. 20, 2011". On the other hand, when the updated date and time of the applicable record in the destination information table 400 designated by the address book ID 5085 is "9:00 on Sep. 1, 2011", the job reuse control module 306 determines that the transmitting destination address 404 in the destination information table 400 concerned has been updated.

Moreover, when the automatic updating destination flag 406 in the destination information table 400 designated by the transmitting destination address 5084 is "YES", and when it is determined that the transmitting destination address 404 is automatically updated, the job reuse control module 306 determines that the destination information has been updated. An example of the destination updated automatically will be described. When the character string "\\server102\[yyyyMM]" is designated as the transmitting destination address 404 in the destination information table 400, and when the transmitting destination address is used on August, 2011, the character string is automatically converted into "\\server102\201108". Then, when the transmitting destination address is used in September, 2011, the character string is automatically converted into "\\server102\201109".

When the job reuse control module 306 determines that the transmitting destination address in the destination information table 400 concerned has been updated after executing the job of the transmitting job history concerned, the process proceeds to step S909 in FIG. 9. When the job reuse control module 306 determines that the destination information concerned has not been updated after executing the job of the transmitting job history concerned, the process proceeds to step S908.

In the step S908, the job reuse control module 306 regards the transmitting destination information stored in the transmitting destination address 5084 of the transmission job history as the retransmitting destination.

As shown in FIG. 9, the job reuse control module 306 obtains the existing destination setting information mentioned above from the job reuse information storage unit 309 in the step S909. The existing destination setting information is established by the administrator by selecting the check box 8011, 8012, or 8013 on the retransmission setting screen 800 shown in FIG. 7, and is stored in the job reuse information storage unit 309 by the job reuse setting module 304. When the existing destination setting information at the time of the post-transmission update of destination information that the job reuse control module 306 obtained from the job reuse information storage unit 309 is "use information in address book", the process proceeds to step S910. On the other hand, when the existing destination setting information at the time of the post-transmission update of destination information that the job reuse control module 306 obtained from the job reuse information storage unit 309 is "use transmission history information", the process proceeds to step S911. Otherwise, when the existing destination setting information at the time of the post-transmission update of destination information that the job reuse control module 306 obtained from the job reuse information storage unit 309 is "request user to confirm", the process proceeds to step S912.

In the step S910, the job reuse control module 306 regards the transmitting destination information stored in the transmitting destination address 404 in the destination information table 400 of the address storage unit 307 designated by the address book ID 5085 of the transmission job history as the existing retransmitting destination. Then, the job reuse control module 306 directs the operation control module 301 so as to show the existing retransmitting destination on the history job rerun screen displayed on the operation unit 207.

In the step S911, the job reuse control module 306 directs the operation control module 301 so as to show the transmitting destination information stored in the transmitting destination address 5084 of the transmission job history on the history job rerun screen displayed on the operation unit 207 as the existing retransmitting destination.

In the step S912, the job reuse control module 306 makes the operation control module 301 display the retransmitting destination selection screen 700 shown in FIG. 6 on the operation unit 207.

In step S913, the operation control module 301 notifies the job reuse control module 306 of the user's selection operation on the retransmitting destination selection screen 700. When the operation control module 301 notified the job reuse control module 306 that the user selected the choice 701 to use information in an address book on the retransmitting destination selection screen 700, the process proceeds to step S914. On the other hand, when the operation control module 301 notified the job reuse control module 306 that the user selected the choice 702 to use transmission history information on the retransmitting destination selection screen 700, the process proceeds to step S915. Otherwise, when the operation control module 301 notified the job reuse control module 306 that the user selected the choice 703 to input a new transmitting destination on the retransmitting destination selection screen 700, the process proceeds to step S916.

In the step S914, the job reuse control module 306 regards the transmitting destination information stored in the transmitting destination address 404 in the destination information table 400 of the address storage unit 307 designated by the address book ID 5085 of the transmission job history as the existing retransmitting destination.

In the step S908, the job reuse control module 306 regards the transmitting destination information stored in the transmitting destination address 5084 of the transmission job history as the retransmitting destination.

In step S916, the job reuse control module 306 regards the new transmitting destination notified in the step S913 as the retransmitting destination.

In step S917 in FIG. 8, the job reuse control module 306 directs the transmission control module 303 to perform a transmitting process to the destination designated as the retransmitting destination, and the transmission control module 303 directed performs the transmitting process. In step S918, the transmission control module 303 adds the information about a result of the job of the transmitting process (success/failure, end code) to the job history information table 500 in the job history storage unit 308, and finishes this process.

As described above, when the information about the transmitting destination managed by the address book that was used at the time of the transmission job was updated after the execution date and time of the transmission job, the present invention provides the following choices at the time of retransmission using the job history. The first choice is to retransmit data to the transmitting destination address that was used by the transmission job using the history information of the transmission job. The second choice is to retransmit data to the updated transmitting destination registered in the address book. This enables to retransmit data to a desired destination without retransmitting data to a destination that a user does not mean.

For example, it is assumed that a transmission job reuses the history information of the transmission job that transmitted data to "monthly report submission folder" ("\\server102\201108") in August, 2011, and that the "monthly report submission folder" of the address book was updated to "\\server102\201109". In that case, the retransmitting destination can be determined by selecting "\\server102\201109" or "\\server102\201108".

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-202770, filed on Sep. 14, 2012, which is hereby incorporated by reference herein in its entirety.

What is claimed is:

1. An information processing apparatus comprising:
    a non-transitory memory device;
    a processor;
    a display device;
    an address storage device configured to store addresses;
    an input unit configured to input image data;
    a setting unit configured to allow a user to set one of the addresses stored in said address storage unit;
    a transmission unit configured to transmit the image data inputted by said input unit to the address set by said setting unit;
    a history storage device configured to store a transmission history of the image data transmitted by said transmission unit, the transmission history including a transmission date, an address, and an address identifier for identifying the address that is stored in said address storage device;
    a determination unit configured to determine whether the address identified by the address identifier was updated after the transmission date recorded in the transmission history, when a user directs to transmit image data using the transmission history; and
    a control unit configured to enable to select an address to which the image data is to be transmitted from among addresses simultaneously displayed on the display device, the simultaneously displayed addresses including the address recorded in the transmission history and an updated address that is identified by the address identifier, when said determination unit determines that the address identified by the address identifier was updated after the transmission date recorded in the transmission history,
    wherein the input unit, the setting unit, the transmission unit, the determination unit, and the control unit are implemented at least in part by the processor executing at least one program recorded on the non-transitory memory device.

2. The information processing apparatus according to claim 1, wherein said control unit displays an address selection screen on the display device for making a user select an address to which the image data is to be transmitted from among the address recorded in the transmission history, an updated address that is identified by the address identifier, and a new address, when said determination unit determines that the address identified by the address identifier was updated after the transmission date recorded in the transmission history.

3. The information processing apparatus according to claim 1, wherein said control unit automatically updates an address stored in said address storage device.

4. The information processing apparatus according to claim 1, wherein said control unit manually updates an address stored in said address storage device.

5. The information processing apparatus according to claim 1, further comprising:
    a reuse setting unit configured to set whether reuse of the address recorded in the transmission history is permitted at the time of retransmission of image data using the transmission history,
    wherein said control unit enables to select an address to which the image data is to be transmitted from among the address recorded in the transmission history and an updated address that is identified by the address identifier, when said reuse setting unit has already set to permit reuse of the address recorded in the transmission history, and when said determination unit determines that the address identified by the address identifier was updated after the transmission date recorded in the transmission history, and
    wherein the reuse setting unit is implemented at least in part by the processor executing at least one program recorded on the non-transitory memory device.

6. The information processing apparatus according to claim 5, wherein said reuse setting unit displays a reuse setting screen for setting whether reuse of the address recorded in the transmission history is permitted on the display device.

7. The information processing apparatus according to claim 5, wherein said control unit enables to select an address that is regarded as an existing address among the address recorded in the transmission history and an updated address that is identified by the address identifier, when said reuse setting unit has already set to permit reuse of the address recorded in the transmission history, and when said determination unit determines that the address identified by the address identifier was updated after the transmission date recorded in the transmission history.

8. A method comprising:
    storing addresses in an address storage device;
    inputting image data;
    allowing a user to set one of the addresses stored in said address storage device;
    transmitting the input image data to the set address;
    storing a transmission history of the transmitted image data, the transmission history including a transmission date, an address, and an address identifier for identifying the address that is stored in said address storage device;
    determining whether the address identified by the address identifier was updated after the transmission date recorded in the transmission history, when a user directs to transmit image data using the transmission history; and enabling to select an address to which the image data is to be transmitted from among addresses simultaneously displayed on a display device, the simultaneously displayed addresses including the address recorded in the transmission history and an updated address that is identified by the address identifier, when it is determined that the address identified by the address identifier was updated after the transmission date recorded in the transmission history.

9. A non-transitory computer-readable storage medium storing a control program causing a computer to execute a method, the method comprising:

storing addresses in an address storage device;

inputting image data;

allowing a user to set one of the addresses stored in said address storage device;

transmitting the input image data to the set address;

storing a transmission history of the transmitted image data, the transmission history including a transmission date, an address, and an address identifier for identifying the address that is stored in said address storage device;

determining whether the address identified by the address identifier was updated after the transmission date recorded in the transmission history, when a user directs to transmit image data using the transmission history; and enabling to select an address to which the image data is to be transmitted from among addresses simultaneously displayed on a display device, the simultaneously displayed addresses including the address recorded in the transmission history and an updated address that is identified by the address identifier, when it is determined that the address identified by the address identifier was updated after the transmission date recorded in the transmission history.

* * * * *